(12) United States Patent
Gu (10) Patent No.: US 6,287,464 B1
(45) Date of Patent: Sep. 11, 2001

(54) OIL FILTER ASSEMBLY

(76) Inventor: Jong Chul Gu, 704-12, Geumjung-dong, Goonpo-si, Gyunggi-do 435-050 (KR)

( * ) Notice: Subject to any disclaimer, the term of this patent is extended or adjusted under 35 U.S.C. 154(b) by 0 days.

(21) Appl. No.: 09/642,043

(22) Filed: Aug. 18, 2000

(51) Int. Cl.$^7$ ............................ B01D 27/08; B01D 27/10; B01D 35/30; B01D 35/02; B01D 35/147

(52) U.S. Cl. ............................ 210/179; 210/232; 210/184; 210/223; 210/130; 210/443; 210/354

(58) Field of Search ................................. 210/232, 179, 210/184, 223, DIG. 17, 443, 130, 354

(56) References Cited

U.S. PATENT DOCUMENTS

| | | | |
|---|---|---|---|
| 2,132,770 | * | 10/1938 | Weidenbacker . |
| 3,036,711 | * | 5/1962 | Wilhelm . |
| 4,622,136 | * | 11/1986 | Karcey . |
| 5,066,391 | * | 11/1991 | Faria . |
| 5,817,232 | * | 10/1998 | Roll et al. . |

FOREIGN PATENT DOCUMENTS

773054 * 5/1997 (EP) .

* cited by examiner

*Primary Examiner*—Thomas M. Lithgow
(74) *Attorney, Agent, or Firm*—Snell & Wilmer L.L.P.

(57) ABSTRACT

An oil filter assembly comprises: a cylindrical main housing having an open upper end; a cover assembled with an upper end thereof; an impeller housing disposed beneath a lower surface thereof; a mixer disc fixedly inserted in the impeller housing; an impeller disposed on an upper surface of the mixer disc to mix foreign material contained in an oil; an adjust housing disposed under the impeller to supply the oil when an engine is operated; a filter member for filtering off the foreign material from the oil supplied from the impeller; an overflow valve for controlling a quantity of introduced oil and capturing metallic foreign material from the oil supplied from the impeller by means of a magnetic force; and a fixing-and-oil-discharging bolt for assembling elements disposed in the main housing by means of the cover and supplying the oil filtered and cleaned to parts of an engine. The oil filter assembly has a superior capability of capturing foreign material, so that the lubrication of the engine can be smoothly performed and the power of the engine is increased. Moreover, the engine oil is immediately supplied when the engine is started, so as to prevent an initial wear of the elements due to a delay of oil supply, and the time for warming up the engine is not prolonged even when the oil is cooled to have an increased viscosity.

18 Claims, 8 Drawing Sheets

FIG. 1

(PRIOR ART)

OIL FILTER ASSEMBLY

BACKGROUND OF THE INVENTION

1. Field of the Invention

The present invention relates to an oil filter assembly of an automobile, and more particularly to an oil filter assembly, in which foreign material contained in oil circulating in an engine is filtered off by means of a filter member, and simultaneously is condensed and eliminated by means of magnets, so that the assembly has a superior lubrication capability, and in which only the filter paper has to be replaced and the other elements can be used semi-permanently.

2. Description of the Related Art

Figure 1:
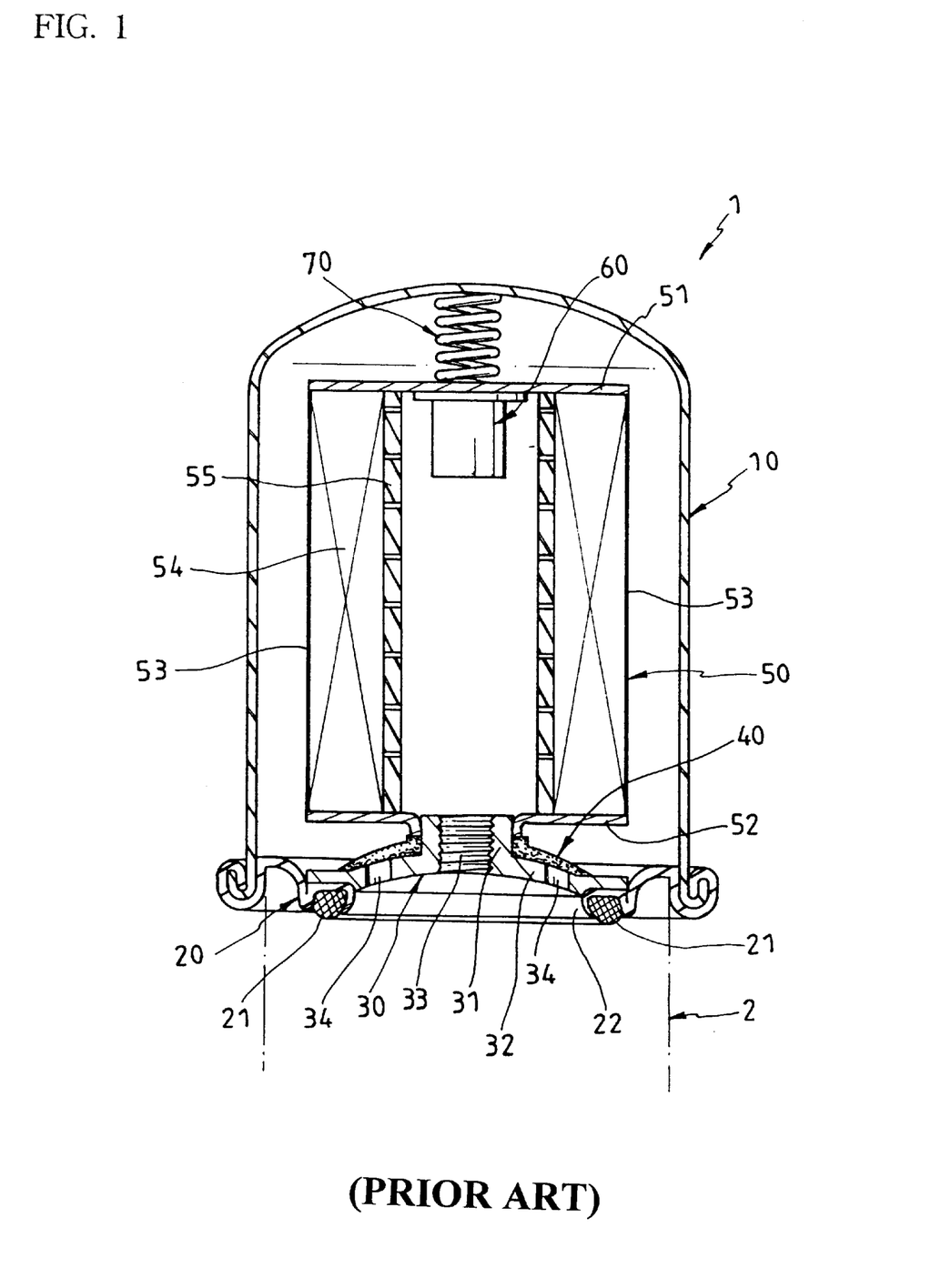
FIG. 1 is a sectional view of a conventional oil filter assembly.

FIG. 1 is a sectional view of a conventional oil filter assembly, which is employed in an automobile, so as to filter off impurities from an engine oil circulating in an oil circulation system of the automobile.

As shown in FIG. 1, the conventional oil filter assembly 1 generally includes a housing 10 having an open lower end and a sealing cover 20 fixed to the lower end of the housing 10 by a seaming joint. The sealing cover 20 has a hole 22 formed at a center of the sealing cover 20 and a packing ring 21 fixed to a lower surface of the sealing cover 20. A lower assembling member 30 is assembled on the hole 22 of the sealing cover 20 and has a boss 31 formed upward at a center thereof and a flange 32 formed at a lower end of the boss 31. The boss 31 has a discharging-and-assembling hole 33. A diaphragm valve 40 is disposed at an upper surface of introduction holes 34 formed at a flange 32 of the lower assembling member 30. A filter member 50 includes upper and lower plates 51 and 52, and a filtering net 53, a filter paper 54, and a punched plate 55 interposed between the upper and the lower plates 51 and 52. The lower plate 52 is assembled with an upper portion of the boss 31. An overflow valve 60 is disposed at a center portion of the upper plate 51 of the filter member 50 and protrudes downward, so as to control the quantity of the discharged oil. A spring 70 is disposed between the upper plate 51 of the filter member 50 and the top of the housing 10, so as to elastically press the filter member 50 downward.

In the conventional oil filter assembly 1, oil is supplied from an oil fan (not shown) by an oil pump 2 when an engine is operated. The supplied oil flows into the introduction holes 34 while pushing the diaphragm valve 40, and then passes through the filtering net 53, the filter paper 54, and the punched plate 55, so that the foreign material contained in the oil is filtered off. Thereafter, only the cleaned oil by filtering is supplied to lubrication parts of the engine through a lower portion of the central space of the filter member 50 and the discharging-and-assembling hole 33. The supplied oil is retrieved again into the oil fan after lubrication.

In this case, when the quantity of the oil introduced through the introduction holes 34 in the oil filter assembly 1 is too much, so that the pressure of the oil exceeds a predetermined value, the oil is discharged through an upper space in the oil filter assembly 1 and the overflow valve 60 into the central space of the filter member 50.

However, in the conventional oil filter assembly 1 as described above, since the cover 20, with which the lower assembling member 30 is assembled, and the housing 10 are fixed to each other by a seaming joint, the elements contained in the housing 10 cannot be separated after they are assembled with each other. Accordingly, in order to replace the filter member due to the degradation of the engine oil, the entire oil filter assembly 1 has to be replaced. In this regard, the conventional oil filter assembly is uneconomical.

Moreover, since it is nearly impossible to regenerate and reuse the conventional oil filter assembly 1, the conventional oil filter assembly 1 has to be deserted after its one-time life span. Especially when the deserted oil filter assembly 1 is not collected in a designated place and properly treated, the waste oil and impurities may be leaked from the oil filter assembly 1, thereby polluting the environment. Owing to the failure in the disposal of the oil filter, the expense for treating and deserting the used oil filter is increased, thereby causing an economical disadvantage.

SUMMARY OF THE INVENTION

Accordingly, the present invention has been made in an effort to solve the problems occurring in the related art, and it is an object of the present invention to provide an oil filter assembly, which has a superior capability of capturing foreign material entrained in the oil during the lubrication by the oil, so that the lubrication of the engine can be smoothly performed and the power of the engine is increased.

It is another object of the present invention to provide an oil filter assembly, by which the engine oil is immediately supplied to the lubricated elements of the engine, simultaneously when the engine is started, so as to prevent an initial wear of the elements due to a delay of oil supply, thereby prolonging the life span of the engine.

It is another object of the present invention to provide an oil filter assembly, by which the time for warming up the engine is not prolonged even when the oil is cooled and its viscosity is increased in the winter time, but is shortened.

It is another object of the present invention to provide an oil filter assembly, by which the time when the filter member has to be replaced is alarmed to the user, and the oil is always sufficiently supplied to the engine through bypass channels.

In accordance with one aspect of the present invention, there is provided an oil filter assembly comprising: a cylindrical main housing having an open upper end; a cover assembled with an upper end of the main housing; an impeller housing disposed beneath a lower surface of the cover; a mixer disc fixedly inserted in the impeller housing; an impeller disposed on an upper surface of the mixer disc to mix foreign material contained in an oil; an adjust housing disposed under the impeller to supply the oil when an engine is operated; a filter member for filtering off the foreign material from the oil supplied from the impeller; an overflow valve for controlling a quantity of introduced oil and capturing metallic foreign material from the oil supplied from the impeller by means of a magnetic force; and a fixing-and-oil-discharging bolt for assembling elements disposed in the main housing by means of the cover and supplying the oil filtered and cleaned to parts of an engine.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE EMBODIMENTS

Hereinafter, described in detail will be several preferred embodiments of the present invention, with reference to the accompanying drawings.

As shown in FIGS. 2 to 8, an oil filter assembly 100 of the present invention includes a cylindrical main housing 110 having an open upper end, a cover 120 assembled with the upper end of the main housing 110, an impeller housing 130 disposed beneath a lower surface of the cover 120, a mixer disc 140 fixedly inserted in the impeller housing 130, an impeller 150 disposed on an upper surface of the mixer disc 140 to mix foreign material contained in an oil, an adjust housing 160 disposed under the impeller 150 to supply the oil when an engine is operated, a filter member 170 for filtering off the foreign material from the oil supplied from the impeller 150, an overflow valve 180 for controlling a quantity of introduced oil and capturing metallic foreign material from the oil supplied from the impeller 150 by means of a magnetic force, and a fixing-and-oil-discharging bolt 190 for assembling elements disposed in the main housing 110 by means of the cover 120 and supplying the oil filtered and cleaned to parts of an engine.

Figure 2:
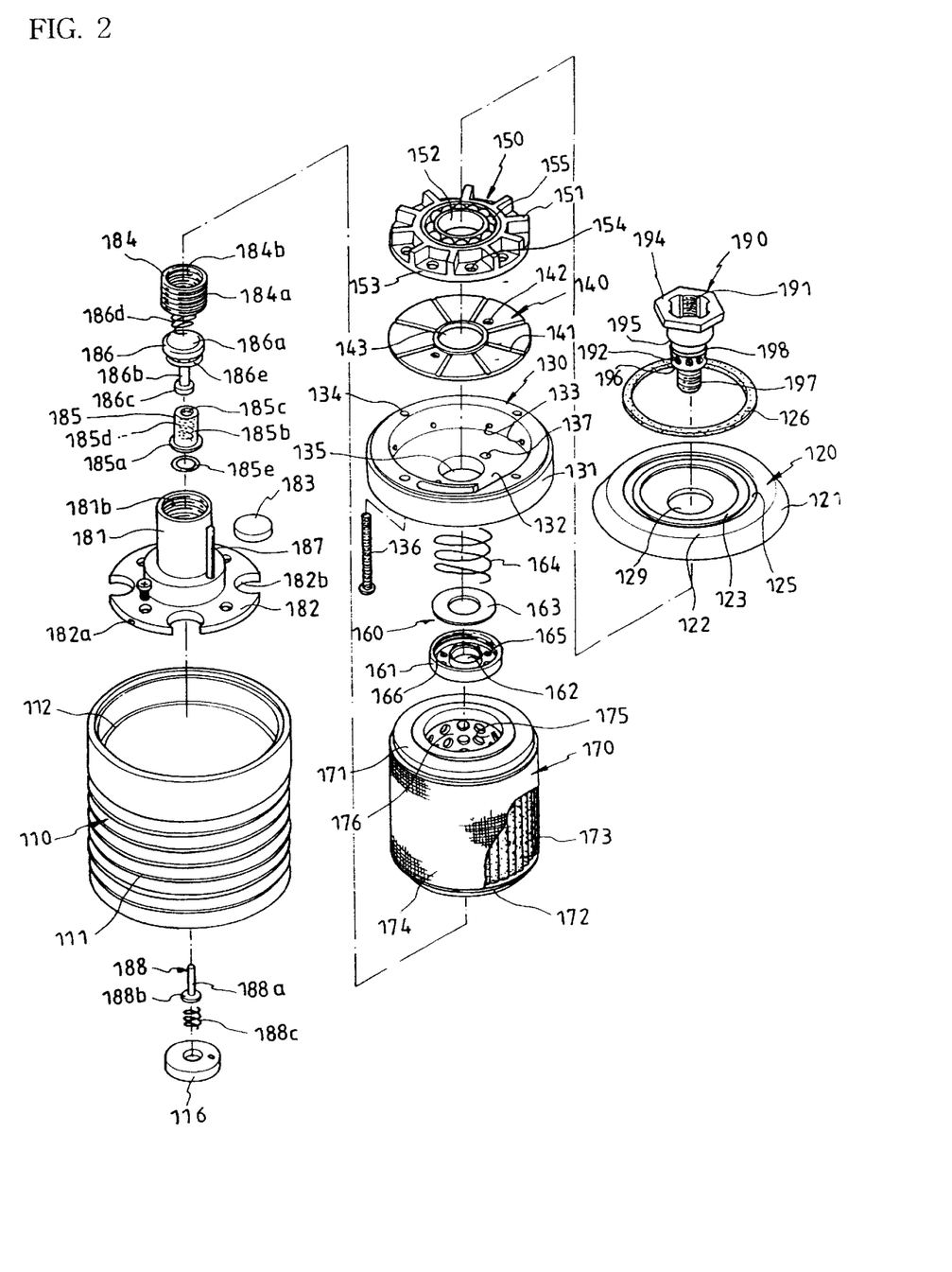
FIG. 2 is an exploded perspective view of an oil filter assembly according to the present invention.

The main housing 110 has a plurality of cooling pins 111 formed at an outer surface of the main housing 110 and a stepped portion 112 formed at an inner surface of the main housing 110. The cooling pins 111 enable the main housing 110 to exchange heat with exterior air more easily. Further, a cylindrical protrusion tube 115 protrudes downward from a center portion of the bottom of the main housing 110, and a bottom hole 113 is formed at the center of the bottom of the main housing 110 in the protrusion tube 115, in such a manner that an inward rim 114 is formed around the bottom hole 113. A coupling member 116 is inserted in the protrusion tube 115.

Figure 3:
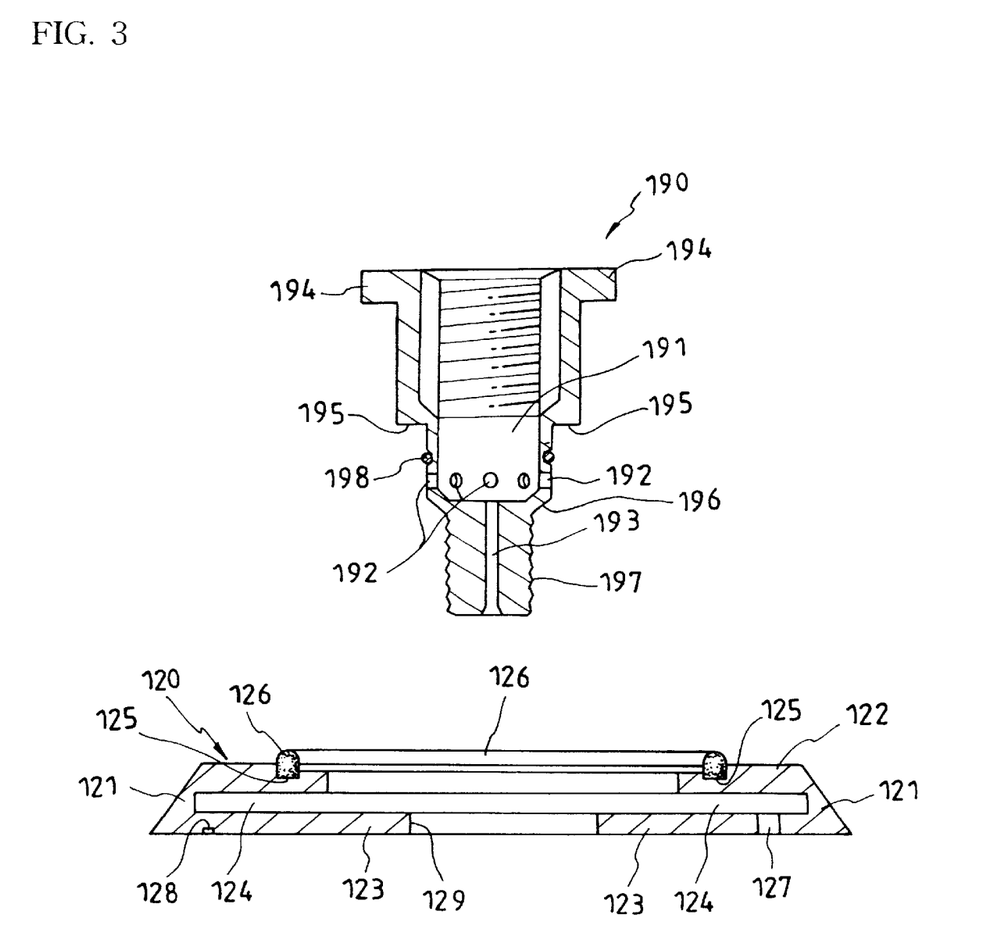
FIG. 3 is a sectional view of a cover and a fixing-and-oil-discharging bolt employed in the oil filter assembly shown in FIG. 2.

The cover 120 has an annular shape, and has a first center hole 129 formed at the center of the cover 120. The cover 120 also has a side wall 121, and an upper ceiling 122 and a lower ceiling 123 respectively extending inward and disposed at upper and lower portions of the cover 120, between which is formed a cover space 124. In this case, the lower ceiling 123 has a width larger than that of the upper ceiling 122 and has a exposed upper surface, so that the head of the fixing-and-oil-discharging bolt 190 is engaged with the lower ceiling 123. A first oil passage hole 127 is formed at a predetermined portion of the lower ceiling 123, through which the oil retrieved from the engine is introduced. A first screw hole 128 is formed at a predetermined portion of the lower ceiling 123. Further, the upper ceiling 122 has an annular groove 125 formed at an upper surface of the upper ceiling 122, in which a packing 126 is inserted.

Figure 4:
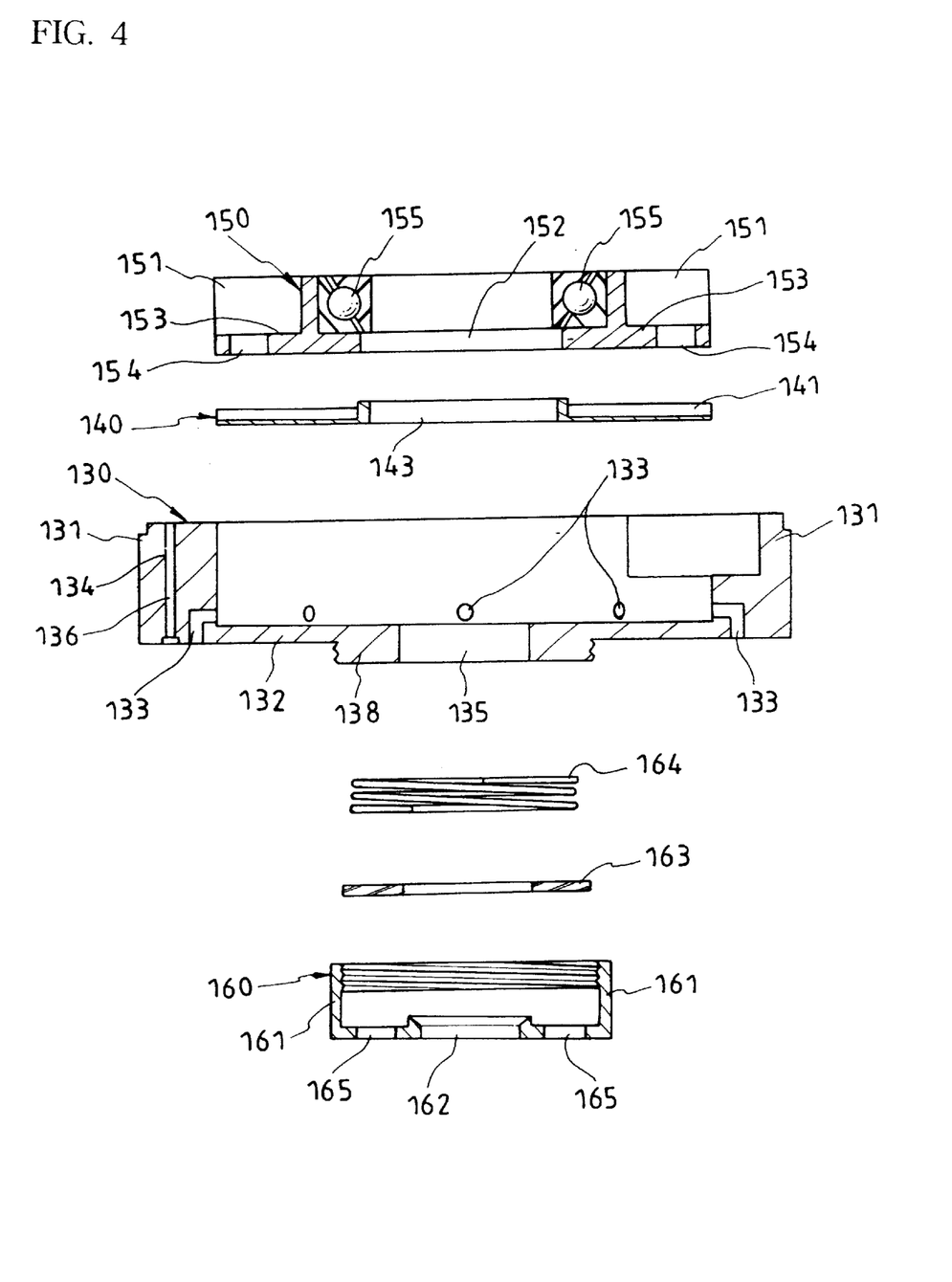
FIG. 4 is an exploded sectional view of an impeller, a mixer disc, an impeller housing, and an adjacent housing employed in the oil filter assembly shown in FIG. 2.

The impeller housing 130 has a shape of a cylinder whose upper face is open. The impeller housing 130 has a plurality of second oil passage holes 133 formed at a side wall 131 near a corner between the side wall 131 and a bottom plate 132. The second oil passage holes 133 extend partially in radial directions and are bent vertically downward in the side wall 131 to be interconnected to the space beneath the side wall 131. Further, the impeller housing 130 has a second center hole 135 formed at a center of the bottom plate 132 of the impeller housing 130 and second screw holes 137 formed at a predetermined portion of the bottom plate 132. In addition, the impeller housing 130 has first assembling holes 134 vertically extending through the side wall 131 of the impeller housing 130, so that first assembling screws 136 can be screwed through the first assembling holes 134 into the first screw hole 128 of the cover 120. In this case, the lower end of the side wall 131 of the impeller housing 130 abuts on the stepped portion 112 formed at the inner surface of the main housing 110. Meanwhile, an assembling protrusion 138 having a screw formed at an outer surface of the assembling protrusion 138 protrudes downward from the periphery of the second center hole 135 of the impeller housing 130.

The mixer disc 140 has a plurality of oil guide grooves 141 extending in radial directions on the mixer disc 140 and corresponding to the second oil passage holes 133 formed at the side wall 131 of the impeller housing 130. The mixer disc 140 also has second assembling holes 142 corresponding to the second screw holes 137 formed at the bottom plate 132, so that a fixing element such as a screw can be inserted through the second screw holes 137 and the second assembling holes 142. Further, the mixer disc 140 has a third center hole 143 formed t the center of the mixer disc 140. In this case, the mixer disc 140 is made of a carbon steel for a mechanic structural element such as S45C, so as to prevent the mixer disc 140 from being worn due to the mixing and to prevent foreign material contained in the oil from being adhered to the surface of the mixer disc 140.

The impeller 150 has a fourth center hole 152 formed at the center of the impeller 150, and has a plurality of blades 151 formed extending in radial directions around the impeller 150 and a rotation plate 153 formed integrally with lower ends of the blades 151. Further, the rotation plate 153 of the impeller 150 has a plurality of third oil passage holes 154 corresponding to the oil guide grooves 141 of the mixer disc 140. In this case, it is preferred that the rotation plate 153 is made from the same material as that of the mixer disc 140, and that bearings 155 are disposed around the fourth center hole 152, so that the impeller 150 can be smoothly rotated.

The adjust housing 160 has a circular bottom plate 166 and a cylindrical side wall 161 integrated with outer circumference of the bottom plate 166, and has a fifth center hole 162 formed at a center of the bottom plate 166 and a plurality of fourth oil passage holes 165 arranged along a circumference of a circle concentric with the bottom plate 166. Further, an annular plate 163 is disposed on the bottom plate 166 and is elastically forced downward by an adjust spring 164 disposed on the annular plate 163, so that the annular plate 163 opens and closes the fourth oil passage holes 165. Meanwhile, a female screw is formed at an inner surface of the side wall 161 to be engaged with the assembling protrusion 138 of the impeller housing 130. In this case, the adjust spring 164 has such elasticity as that the annular plate 163 can be opened at a pressure lower by a certain degree than a normal pressure of the oil filter assembly 100.

The filter member 170 has an upper plate 171 and a lower plate 172 respectively shaped like an annulus, a filter paper 173 disposed between the upper plate 171 and the lower plate 172, a filtering net 174 surrounding the filter paper 173, and a punched plate 175 fitted in an inner surface of the filter paper 173. The filter paper 173 is formed of papers, synthetic fibers, natural fibers, etc. Further, a sixth center hole 176 is formed extending from a center of the upper plate 171 to a center of the lower plate 172, and has a diameter equal to that of the punched plate 175. A first oil ring 177 is fitted on the upper plate 171.

Figure 5:
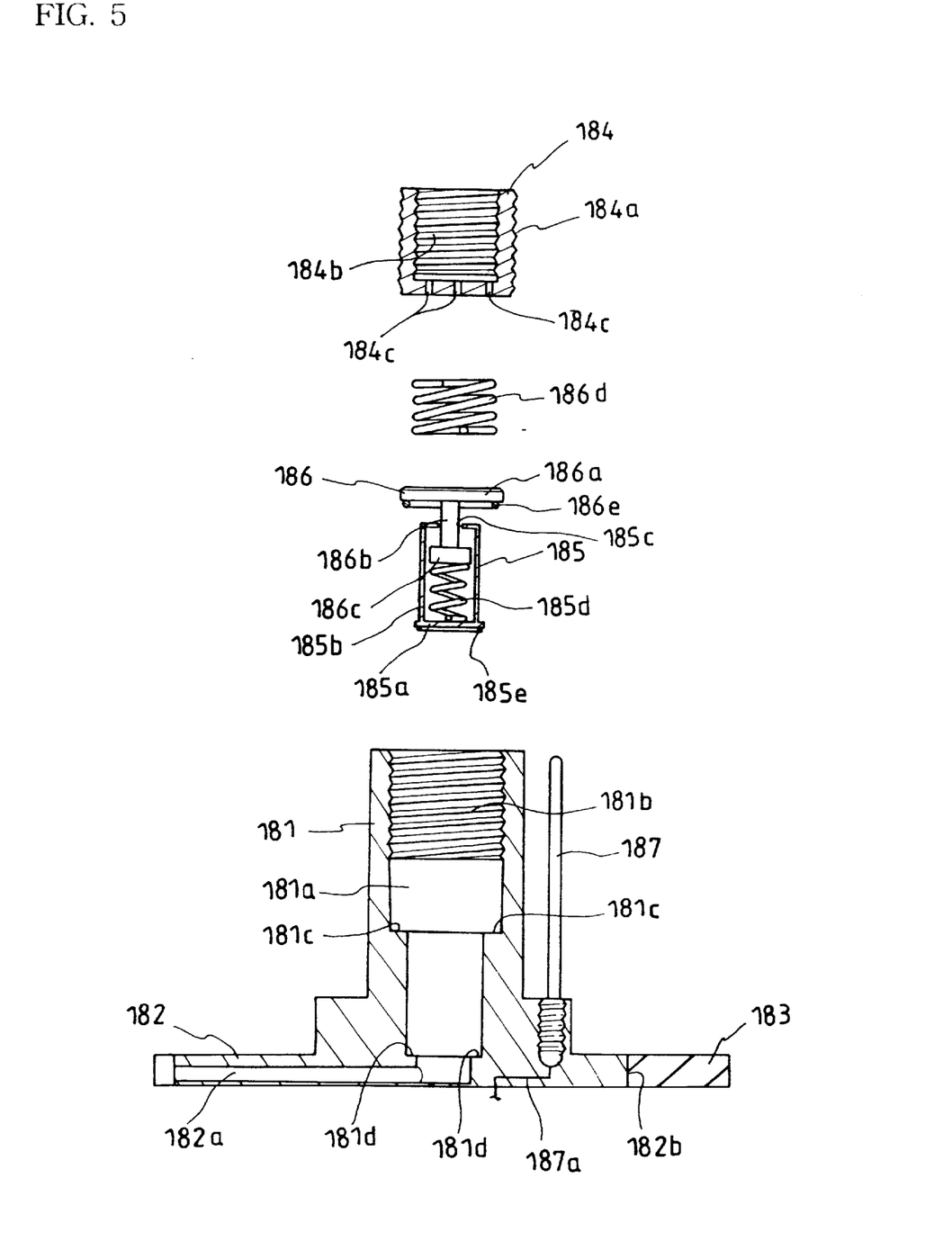
FIG. 5 is an exploded sectional view of an overflow valve employed in the oil filter assembly shown in FIG. 2.

The overflow valve 180 includes a boss 181 vertically received in the filter member 170 and having a first bypass channel 181a formed vertically in the boss 181, a flange 182 extending horizontally outward from a lower end of the boss 181 and having a second bypass channel 182a formed extending horizontally in the flange 182 and connected to the first bypass channel 181a, permanent magnets 183 assembled with predetermined portions of the flange 182 so as to capture foreign material contained in the oil, an assembling member 184 assembled with an upper portion of the boss 181 above the first bypass channel 181a and having a plurality of fifth oil passage holes 184c, a low-pressure actuator 185 disposed under the first bypass channel 181a of the boss 181 to be opened at a state of low pressure, a high-pressure actuator 186 disposed above the first bypass channel 181a of the boss 181 to be opened at a state of high pressure, a heater 187 disposed in the filter member 170 and having a lower end fitted in the flange 182, so as to heat the oil, and a pressure-sensing member 188 for detecting an operation of the high-pressure actuator 186.

The boss 181 has a second assembling screw 181b formed at an upper portion of an inner surface of the first bypass channel 181a, and has an upper stepped portion 181c formed under the second assembling screw 181b and a lower stepped portion 181d formed under the upper stepped portion 181c respectively with certain intervals.

The flange 182 has a plurality of receiving grooves 182b formed at peripheral portions of the flange 182, in which the permanent magnets 183 are fixedly inserted.

The assembling member 184 has a shape of a cylinder having an open upper end and a closed lower end, which is a bottom plate of the assembling member 184. The assembling member 184 also has a plurality of the fifth oil passage holes 184c formed through the bottom plate of the assembling member 184, and has a male screw 184a and a female screw 184b respectively formed at outer and inner surfaces of the side wall of the assembling member 184. The male screw 184a is engaged with the second assembling screw 181b formed at the first bypass channel 181a of the boss 181.

The low-pressure actuator 185 has a low-pressure actuator plate 185a corresponding to the lower stepped portion 181d formed at the first bypass channel 181a of the boss 181. A second oil ring 185e is disposed between the lower stepped portion 181d and the low-pressure actuator plate 185a. A cylindrical guide tube 185b is formed integrally with the low-pressure actuator plate 185a and extends upward from the low-pressure actuator plate 185a. A low-pressure actuator spring 185d is inserted in the guide tube 185b, and a guide tube hole 185c is formed at an upper end of the guide tube 185b.

The high-pressure actuator 186 has a high-pressure actuator plate 186a corresponding to the upper stepped portion 181c formed at the fist bypass channel 181a of the boss 181, a high-pressure actuator rod 186b extending downward from a lower surface of the high-pressure actuator plate 186a, and a pressing plate 186c formed at a lower end of the high-pressure actuator rod 186b. A third oil ring 186e is disposed between the high-pressure actuator plate 186a and the upper stepped portion 181c. The high-pressure actuator rod 186b is inserted in the guide tube hole 185c of the guide tube 185b, so that the pressing plate 186c can press the low-pressure actuator spring 185d of the low-pressure actuator 185. On an upper surface of the high-pressure actuator 186 is disposed a high-pressure actuator spring 186d for elastically pressing the high-pressure actuator 186 downward. The high-pressure actuator spring 186d of the high-pressure actuator 186 has elasticity larger than that of the low-pressure actuator spring 185d of the low-pressure actuator 185.

The heater 187 has connection lead wires 187a drawn out to a predetermined location outside of the bottom plate of the main housing 110, so that the connection lead wires 187a can be operated outside.

The pressure-sensing member 188 has a sensing rod 188a and a supporting plate 188b formed integrally with a lower end of the sensing rod 188a, and a pressure-sensing member spring 188c disposed under the supporting plate 188b. The pressure-sensing member 188 is disposed in the protrusion tube 115 of the main housing 110, in such a manner that the sensing rod 188a is inserted through the bottom hole 113 and the supporting plate 188b is elastically supported by the pressure-sensing ember spring 188c. Then, the coupling member 116 is assembled with the protrusion tube 115. In this case, the pressureensing member spring 188c has elasticity smaller than that of the low-pressure actuator spring 185d of the low-pressure actuator 185. Therefore, the upper end of the sensing rod 188a is in close contact with the low-pressure actuator plate 185a when the low-pressure actuator 185 is closed. On the other hand, when the low-pressure actuator 185 is moved upward to be open due to generation of high pressure or low pressure, the sensing rod 188a is also moved upward by the elasticity of the pressure-sensing member spring 188c, so that this state can be detected.

Reference numeral 188d not described above designates connection wires.

The fixing-and-oil-discharging bolt 190 has a screw formed at an outer surface of a lower portion of the fixing-and-oil-discharging bolt 190, which is inserted through the first to the sixth center holes 129, 135, 143, 152, 162, and 176 to be assembled with the female screw 184b of the assembling member 184 assembled with the boss 181. The fixing-and-oil-discharging bolt 190 also has a first shoulder 195 and a second shoulder 196 respectively pressing the impeller housing 130 and the adjust housing 160, and has a head 194 pressing the cover 120, so as to press a packing or oil rings fitted in the corresponding portions, thereby maintaining an oil-tight seal in the portions. The fixing-and-oil-discharging bolt 190 also has a main oil-discharging hole 191 extending vertically from an upper end of the fixing-and-oil-discharging bolt 190 to a predetermined level in the fixing-and-oil-discharging bolt 190, a vertical oil channel 193 interconnecting the main oil-discharging hole 191 with the first bypass channel 181a of the boss 181, and horizontal oil passage holes 192 interconnecting the main oil-discharging hole 191 with an interior of the adjust housing 160. Further, a fourth oil ring 198 is interposed between an inner surface of the second center hole 135 and an outer surface of the fixing-and-oil-discharging bolt 190, so as to maintain an oil-tight seal therebetween. Moreover, a main screw 199 is formed at an inner surface of the main oil-discharging hole 191.

Hereinafter, described will be an operation of the apparatus of the present invention.

Figure 6:
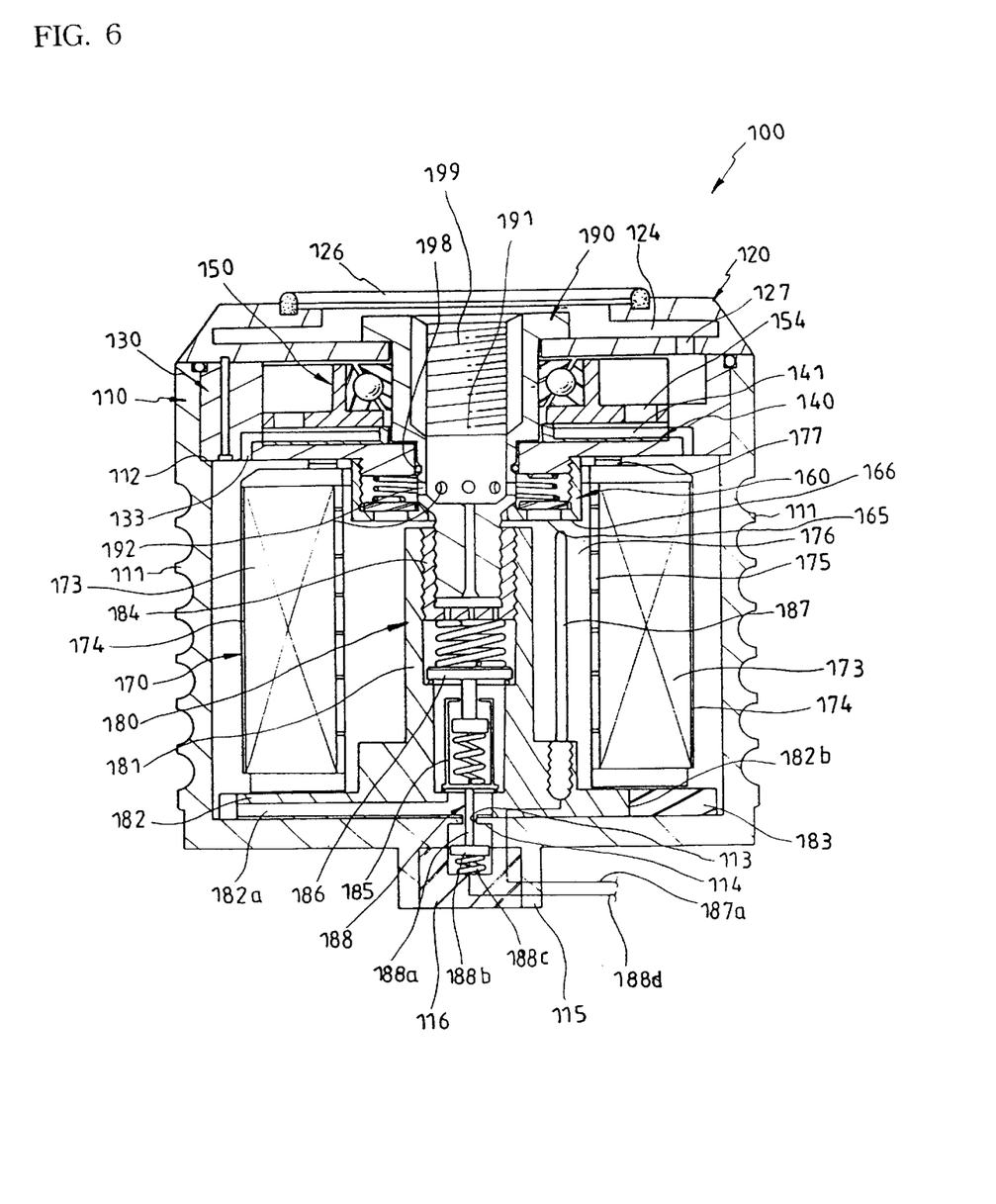
FIG. 6 is a sectional view of the oil filter assembly shown in FIG. 2, in a normal pressure state.

An oil contaminated after circulating in an engine is introduced from an oil fan into the cover space 124 formed in the cover 120 of the oil filter assembly 100 by an oil pump, and then is supplied into the impeller housing 130 through the first oil passage hole 127.

When the contaminated oil is supplied into the impeller housing 130, the pressure of the oil is transferred to the blades 151, so that the impeller 150 is rotated. At this time, due to the rotation of the rotation plate 153 according to the rotation of the impeller 150, there is generated a friction between the mixer disc 140 and the rotation plate 153, so that foreign material is condensed in the contaminated oil introduced through the third oil passage holes 154 of the rotation plate 153.

That is, foreign material including steel fragments produced in sliding elements of the engine, carbon produced due to an incomplete combustion of fuel or oil, oxide produced by degradation or aging of the oil, and dust contained in the oil by being introduced in the suction air, are condensed while being mixed due to compression and friction by the rotation.

The oil containing the condensed foreign material is introduced through the oil guide grooves 141 of the mixer disc 140 and the second oil passage holes 133 of the impeller housing 130 into the space formed outside of the filter member 170.

In this case, the foreign material contained in the oil is captured by the filter paper 173 attached to the flange 182 of the overflow valve 180 by means of its magnetic force.

Thereafter, the oil is continuously introduced through the filtering net 174, the filter paper 173, and the punched plate 175 of the filter member 170 into the space formed inside of the filter member 170, while the remaining foreign material in the oil is filtered by the filtering net 174, the filter paper 173, and the punched plate 175.

In this case, since even nonmetallic foreign material is also condensed together with the metallic foreign material while the oil passes through the impeller 150, nearly all of the foreign material is captured by the permanent magnets 183.

Therefore, not only the life span of the filter member 170 can be prolonged as long as possible, but also the contaminated oil can be filtered as clean as possible, nearly to its initial state.

That is, the oil cleaned while being introduced into the space inside of the filter member 170 is supplied into the engine through the adjust housing 160 and the fixing-and-oil-discharging bolt 190.

In more detailed description, the adjust spring 164 of the adjust housing 160 is compressed by the pressure of the introduced oil and the sucking force of the oil by the operation of the engine, and the annular plate 163 is pushed upward so that the fourth oil passage holes 165 are open. Then, the oil cleaned by being filtered is supplied again into the engine through the horizontal oil passage holes 192 interconnected to the fourth oil passage holes 165 and the main oil-discharging hole 191.

In the meantime, when the engine is stopped after the automobile is parked, the sucking force by the engine and the pressure of the oil become extinct, so that the annular plate 163 of the adjust housing 160 blocks the fourth oil passage holes 165 by the elasticity of the adjust spring 164, and thereby a filtered clean oil remains in the filter member 170.

Therefore, when the engine is started again after the parking is finished, the clean oil is immediately supplied to the engine, so as to prevent a deterioration of lubrication performance, which may be generated when the engine is started, thereby preventing the life span of the engine from being shortened. Moreover, the driving power is improved, and the time for warming up the engine is shortened.

Meanwhile, the viscosity of the oil is not in a normal range since the temperature of the main housing 110 is too low, the heater 187 is operated to rapidly heat the oil to a proper temperature, so that the oil is supplied to the engine with a normal viscosity.

Therefore, even when the engine is started in a state that the engine is cool in the winter time, the oil is rapidly heated and then supplied into the engine, so as to reduce the time for warming up the engine, and to prevent the power of the engine from being reduced and the life span from being shortened due to the cool oil.

Figure 7:
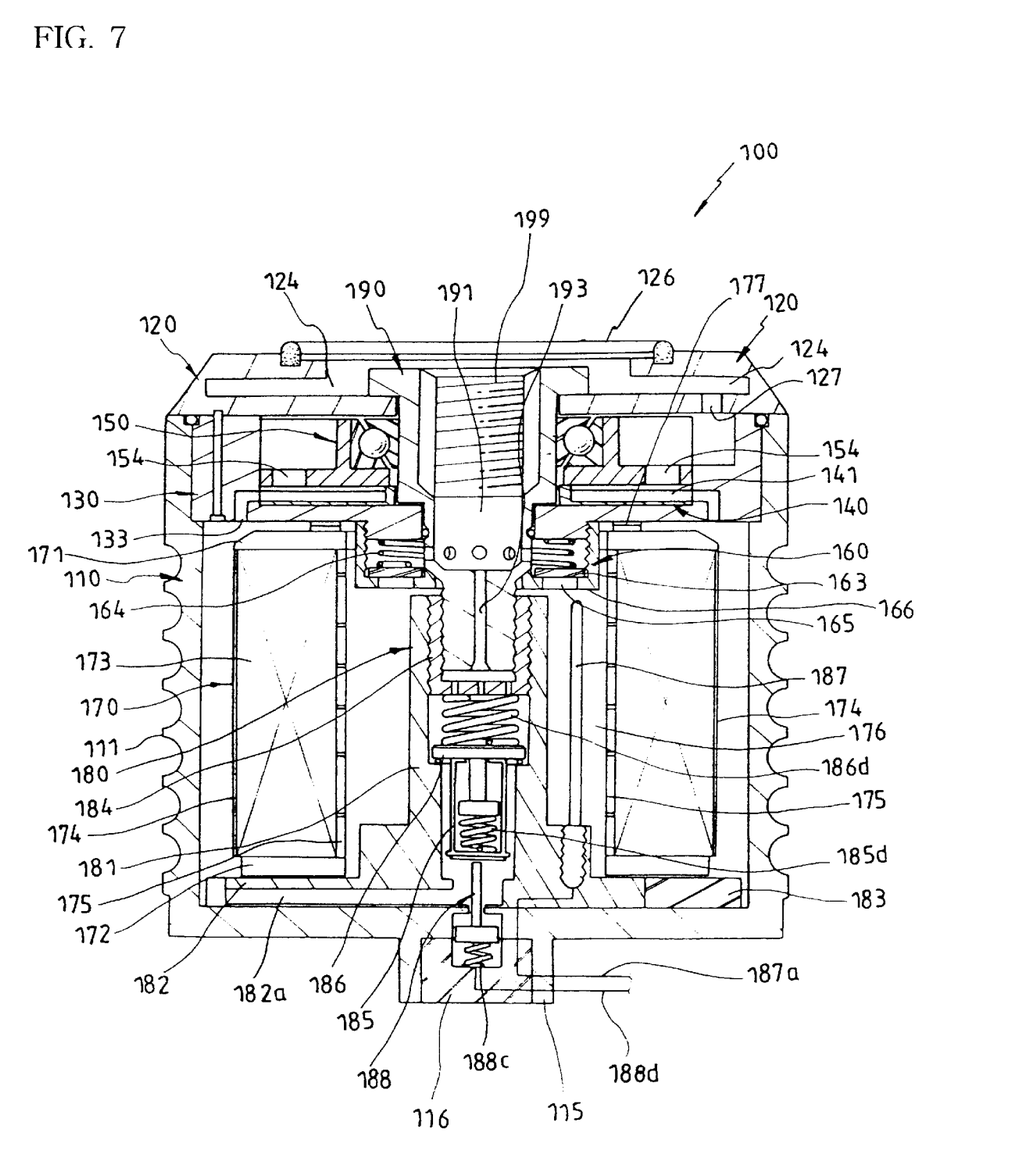
FIG. 7 is a sectional view of the oil filter assembly shown in FIG. 2, in a low pressure state.
Figure 8:
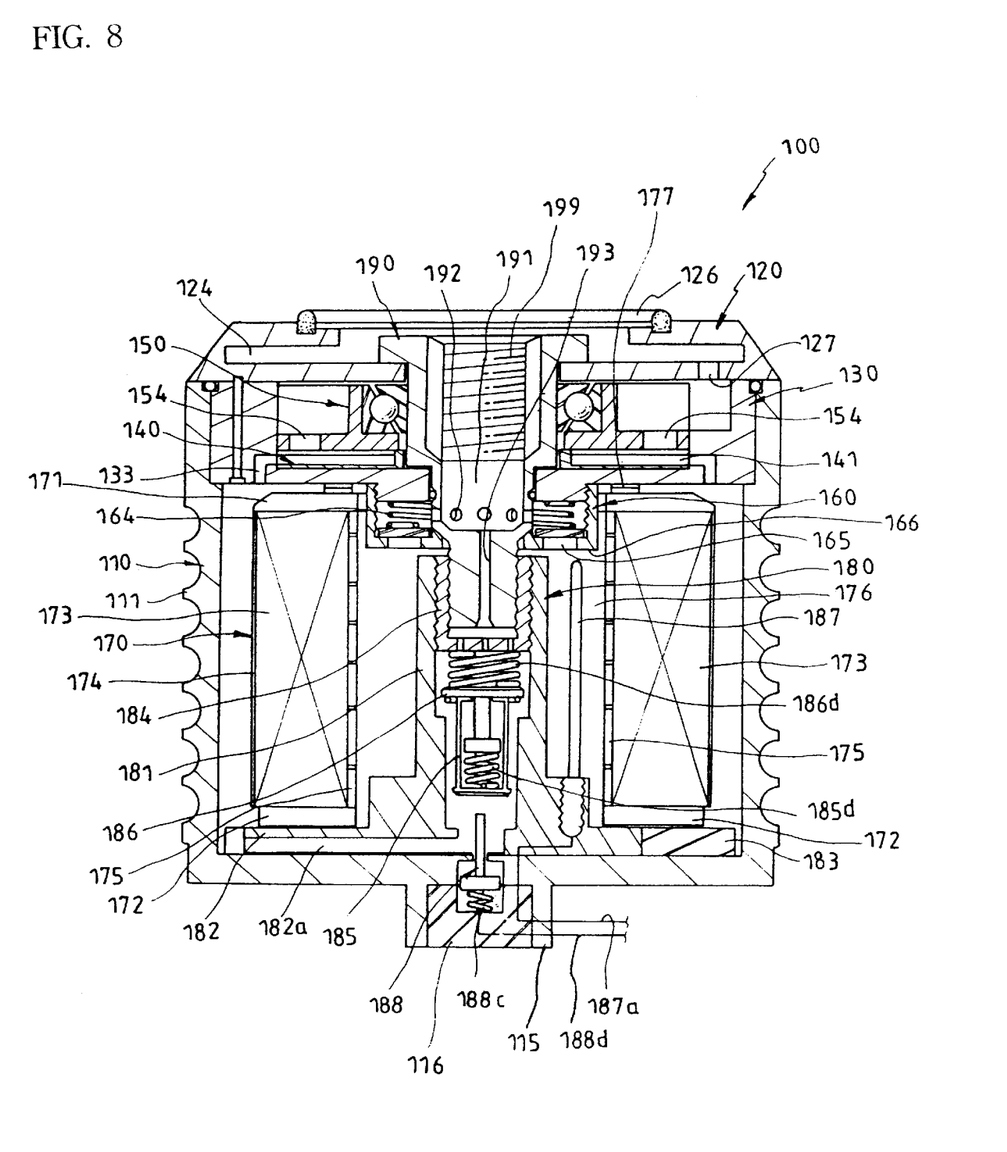
FIG. 8 is a sectional view of the oil filter assembly shown in FIG. 2, in a high pressure state.

In the oil filter assembly of the present invention as described above, when a large quantity of foreign material is accumulated onto elements of the filter member 170 such as the filter paper 173 after the oil filter assembly 100 is used for a long period of time, so that a resistance having a magnitude larger than a predetermined value is applied to the oil flowing through the filter member 170, the oil cannot be properly supplied to the lubrication system of the engine, so that the engine may be damaged and the power of the engine may be reduced. Therefore, in order to prevent the above phenomenon, the overflow valve 180 is operated due to the increase of pressure when the oil is not smoothly supplied.

That is, when the pressure of the oil contained in the space outside of the filter member 170 is increased due to the above-mentioned reason, the pressure is transferred through the second bypass channel 182a formed in the flange 182 of the overflow valve 180 to the first bypass channel 181a of the boss 181 interconnected to the second bypass channel 182a of the flange 182.

In this case, the low-pressure actuator 185 in a closed state, which is disposed under the first bypass channel 181a, is opened while pressing the low-pressure actuator spring 185d due to the increase of the pressure. At the same time, the high-pressure actuator 186 also is opened while pressing the high-pressure actuator spring 186d, so that the oil is rapidly supplied through the fifth oil passage holes 184c of the assembling member 184, and the vertical oil channel 193 and the main oil-discharging hole 191 of the fixing-and-oil-discharging bolt 190 to engine, thereby preventing the engine from being damaged and preventing the life span of the engine from being shortened.

In the meantime, when the low-pressure actuator 185 is opened, the pressure-sensing member 188 is moved upward by the pressure-sensing member spring 188c, and this upward movement of the pressure-sensing member 188 is alarmed by means of a displaying member such as a bell or a lamp to the driver, so that the driver can easily notice the state and replace the filter paper 173.

In the oil filter assembly 100 of the present invention as described above, the low-pressure actuator 185 and the high-pressure actuator 186 prevent the first bypass channel 181a from being opened due to a temporary increase of pressure in a state that the filter member 170 is not blocked.

Meanwhile, the packing 126 disposed on the upper ceiling 122 of the cover 120 is pressed when the oil filter assembly 100 is mounted to the engine, so as to maintain the main oil-discharging hole 191 between the oil filter assembly 100 and the engine to be air-tight.

Moreover, when the filter member 170 is contaminated to a certain degree, the oil filter assembly 100 is separated from the engine, and the fixing-and-oil-discharging bolt 190 is separated from the oil filter assembly 100. Then, the cover 120 and the impeller housing 130 are separated.

From this state, the filter member 170 is drawn out, and the filter paper 173 is replaced. Then, the oil filter assembly 100 is assembled in a reverse order to the above, and then is mounted to the engine.

Moreover, the oil filter assembly 100 of the present invention may be employed in any type of engine of an automobile regardless of the type by modifying the dimension of the main screw 199 of the fixing-and-oil-discharging bolt 190.

As described above, the oil filter assembly 100 of the present invention includes a cylindrical main housing 110 having an open upper end, a cover 120 assembled with the upper end of the main housing 110, an impeller housing 130 disposed beneath a lower surface of the cover 120, a mixer disc 140 fixedly inserted in the impeller housing 130, an impeller 150 disposed on an upper surface of the mixer disc 140 to mix foreign material contained in an oil, an adjust housing 160 disposed under the impeller 150 to supply the oil when an engine is operated, a filter member 170 for filtering off the foreign material from the oil supplied from the impeller 150, an overflow valve 180 for controlling a quantity of introduced oil and capturing metallic foreign material from the oil supplied from the impeller 150 by means of a magnetic force, and a fixing-and-oil-discharging bolt 190 for assembling elements disposed in the main housing 110 by means of the cover 120 and supplying the oil filtered and cleaned to parts of an engine. Therefore, the oil filter assembly of the present invention has a superior capability of capturing foreign material, which is entrained in the oil while the oil circulates in a lubrication system of an engine, so that the lubrication of the engine can be smoothly performed and the power of the engine is increased. Moreover, in the oil filter assembly, the engine oil is immediately supplied to the lubricated elements of the engine, simultaneously when the engine is started, so as to prevent an initial wear of the elements due to a delay of oil supply, thereby prolonging the life span of the engine. Further, in the oil filter assembly, the time for warming up the engine, which is apt to be prolonged due to the increase of viscosity of the oil in the winter time, is shortened, and the oil is always sufficiently supplied to the engine through bypass channels. In addition, the time when the filter member has to be replaced is alarmed to the user. Also, even when the filter member is replaced, other elements excepting the filter member can be used again as they are, so that the oil filter assembly has a nearly permanent life span, and the expense for treating and deserting the oil filter assembly is reduced. Further, the decrease of the deserted oil filter assembly reduces the environmental pollution.

While there have been illustrated and described what are considered to be preferred specific embodiments of the present invention, it will be understood by those skilled in the art that the present invention is not limited to the specific embodiments thereof, and various changes and modifications and equivalents may be substituted for elements thereof without departing from the true scope of the present invention.

What is claimed is:

1. An oil filter assembly comprising:
    a cylindrical main housing having an open upper end;
    a cover assembled with an upper end of the main housing;
    an impeller housing disposed beneath a lower surface of the cover;
    a mixer disc fixedly inserted in the impeller housing;
    an impeller disposed on an upper surface of the mixer disc to mix foreign material contained in an oil;
    an adjust housing disposed under the impeller to supply the oil when an engine is operated;
    a filter member for filtering off the foreign material from the oil supplied from the impeller;
    an overflow valve for controlling a quantity of introduced oil and capturing metallic foreign material from the oil supplied from the impeller by means of a magnetic force; and
    a fixing-and-oil-discharging bolt for assembling elements disposed in the main housing by means of the cover and supplying the oil filtered and cleaned to parts of an engine.

2. An oil filter assembly as claimed in claim 1, wherein the main housing comprises a plurality of cooling pins formed at an outer surface of the main housing, a stepped portion formed at an inner surface of the main housing, and a cylindrical (115) protrusion tube protruding downward from a center portion of the bottom of the main housing, and a bottom hole is formed at a center of the bottom of the main housing in the protrusion tube, in such a manner that an inward rim is formed around the bottom hole, a coupling member being inserted in the protrusion tube.

3. An oil filter assembly as claimed in claim 1, wherein the cover has an annular shape having a first center hole formed at a center of the cover, the cover comprising a side wall, and an upper ceiling and a lower ceiling respectively extending inward and disposed at upper and lower portions of the cover, between which is formed a cover space, the lower ceiling having a width larger than that of the upper ceiling, so that the head of the fixing-and-oil-discharging bolt is engaged with the lower ceiling, the lower ceiling having a first oil passage hole formed at a predetermined portion of the lower ceiling, through which the oil retrieved from the engine is introduced, the upper ceiling having an annular groove formed at an upper surface of the upper ceiling, in which a packing is inserted.

4. An oil filter assembly as claimed in claim 1, wherein the impeller housing has a shape of a cylinder whose upper face is open, the impeller housing having a plurality of second oil passage holes formed at a side wall near a corner between the side wall and a bottom plate and a second center hole formed at a center of the bottom plate of the impeller housing, the second oil passage holes extending partially in radial directions and being bent vertically downward in the side wall to be interconnected to a space beneath the side wall, the impeller housing having an assembling protrusion protruding downward from the periphery of the second center hole of the impeller housing, the assembling protrusion having a screw formed at an outer surface of the assembling protrusion.

5. An oil filter assembly as claimed in claim 1, wherein the mixer disc is assembled with the bottom plate of the impeller housing, and has a plurality of oil guide grooves extending in radial directions on the mixer disc and corresponding to the second oil passage holes formed at the side wall of the impeller housing and a third center hole formed at a center of the mixer disc.

6. An oil filter assembly as claimed in claim 1, wherein the impeller comprises a plurality of blades formed extending in radial directions of the impeller and a rotation plate formed integrally with lower ends of the blades, the impeller having a fourth center hole formed at a center of the impeller, the rotation plate of the impeller having a plurality of third oil passage holes corresponding to the oil guide grooves of the mixer disc.

7. An oil filter assembly as claimed in claim 1, wherein the adjust housing comprises a circular bottom plate, a cylindrical side wall integrated with an outer circumference of the bottom plate, and an annular plate disposed on the bottom plate, and has a fifth center hole formed at a center of the bottom plate and a plurality of fourth oil passage holes arranged along a circumference of a circle concentric with the bottom plate, the annular plate being elastically forced downward by an adjust spring disposed on the annular plate, so that the annular plate opens and closes the fourth oil passage holes.

8. An oil filter assembly as claimed in claim 7, wherein the adjust spring has such elasticity as that the annular plate can be opened at a pressure lower than a normal pressure of the oil filter assembly.

9. An oil filter assembly as claimed in claim 1, wherein the overflow valve comprises:
a boss vertically received in the filter member and having a first bypass channel formed vertically in the boss;
a flange extending horizontally outward from a lower end of the boss and having a second bypass channel formed extending horizontally in the flange and connected to the first bypass channel;
permanent magnets assembled with predetermined portions of the flange so as to capture foreign material contained in the oil;
an assembling member assembled with an upper portion of the boss above the first bypass channel and having a plurality of fifth oil passage holes;
a low-pressure actuator disposed under the first bypass channel of the boss to be opened at a state of low pressure;
a high-pressure actuator disposed above the first bypass channel of the boss to be opened at a state of high pressure;
a heater disposed in the filter member and having a lower end fitted in the flange, so as to heat the oil; and
a pressure-sensing member for detecting an operation of the high-pressure actuator.

10. An oil filter assembly as claimed in claim 9, wherein the boss comprises a second assembling screw formed at an upper portion of an inner surface of the first bypass channel, and an upper stepped portion formed under the second assembling screw and a lower stepped portion formed under the upper stepped portion respectively with certain intervals.

11. An oil filter assembly as claimed in claim 9, wherein the assembling member has a shape of a cylinder having an open upper end and a closed lower end, which is a bottom plate of the assembling member, and has a plurality of the fifth oil passage holes formed through the bottom plate of the assembling member, and the assembling member comprises a male screw and a female screw respectively formed at outer and inner surfaces of side wall of the assembling member, the male screw being engaged with the second assembling screw formed at the first bypass channel of the boss.

12. An oil filter assembly as claimed in claim 9, wherein the low-pressure actuator comprises a low-pressure actuator plate corresponding to the lower stepped portion formed at the first bypass channel of the boss, a second oil ring disposed between the lower stepped portion and the low-pressure actuator plate, a cylindrical guide tube formed integrally with the low-pressure actuator plate and extending upward from the low-pressure actuator plate, and a low-pressure actuator spring inserted in the guide tube, and a guide tube hole is formed at an upper end of the guide tube.

13. An oil filter assembly as claimed in claim 9, wherein the high-pressure actuator comprises a high-pressure actuator plate corresponding to the upper stepped portion formed at the first bypass channel of the boss, a high-pressure actuator rod extending downward from a lower surface of the high-pressure actuator plate, a pressing plate formed at a lower end of the high-pressure actuator rod, and a third oil ring disposed between the high-pressure actuator plate and the upper stepped portion, the high-pressure actuator rod being inserted in the guide tube hole of the guide tube, so that the pressing plate can press the low-pressure actuator spring of the low-pressure actuator.

14. An oil filter assembly as claimed in claim 13, wherein a high-pressure actuator spring for elastically pressing the high-pressure actuator downward is disposed on an upper surface of the high-pressure actuator, the high-pressure actuator spring of the high-pressure actuator having an elasticity larger than that of the low-pressure actuator spring of the low-pressure actuator.

15. An oil filter assembly as claimed in claim 9, wherein the pressure-sensing member comprises a sensing rod and a supporting plate formed integrally with a lower end of the sensing rod, and a pressure-sensing member spring disposed under the supporting plate, and the pressure-sensing member is disposed in the protrusion tube of the main housing, in such a manner that the sensing rod is inserted through the bottom hole and the supporting plate is elastically supported by the pressure-sensing member spring.

16. An oil filter assembly as claimed in claim 15, wherein the pressure-sensing member spring has an elasticity smaller than that of the low-pressure actuator spring of the low-pressure actuator, so that an upper end of the sensing rod is in close contact with the low-pressure actuator plate when the low-pressure actuator is closed, while the sensing rod is moved upward by the elasticity of the pressure-sensing member spring, when the low-pressure actuator is moved upward to be open due to generation of high pressure and low pressure.

17. An oil filter assembly as claimed in claim 1, wherein the fixing-and-oil-discharging bolt has a screw formed at an outer surface of a lower portion of the fixing-and-oil-discharging bolt, which is inserted through first to sixth center holes to be assembled with the female screw of the assembling member assembled with the boss, and the fixing-and-oil-discharging bolt comprises a first shoulder and a second shoulder respectively pressing the impeller housing and the adjust housing, and a head pressing the cover, so as to press a packing and oil rings fitted in corresponding portions, thereby maintaining an oil-tight seal in the portions.

18. An oil filter assembly as claimed in claim 1, wherein the fixing-and-oil-discharging bolt has a main oil-discharging hole extending vertically from an upper end of the fixing-and-oil-discharging bolt to a predetermined level in the fixing-and-oil-discharging bolt, a vertical oil channel interconnecting the main oil-discharging hole with the first bypass channel of the boss, and horizontal oil passage holes interconnecting the main oil-discharging hole with an interior of the adjust housing, and a fourth oil ring is interposed between an inner surface of the second center hole and an outer surface of the fixing-and-oil-discharging bolt, so as to maintain an oil-tight seal therebetween, a main screw being formed at an inner surface of the main oil-discharging hole, the main screw being engaged with a portion of the engine.

* * * * *

UNITED STATES PATENT AND TRADEMARK OFFICE
CERTIFICATE OF CORRECTION

PATENT NO.     : 6,287,464 B1
DATED          : September 11, 2001
INVENTOR(S)    : Ahmet Celikkaya It is certified that error appears in the above-identified patent and that said Letters Patent is hereby corrected as shown below:

Column 9,
Line 62, insert -- . -- after "alumina"

Column 13,
Line 28, insert -- . -- after "thereof"

Column 18,
Line 17, "Al$_{03}$" should read -- Al$_2$O$_3$ --

Column 21,
Line 27, "workpeices" should read -- workpieces --

Signed and Sealed this

Ninth Day of April, 2002

Attest:

JAMES E. ROGAN
*Attesting Officer*   *Director of the United States Patent and Trademark Office*

UNITED STATES PATENT AND TRADEMARK OFFICE
CERTIFICATE OF CORRECTION

PATENT NO.   : 6,287,464 B1
DATED        : September 11, 2001
INVENTOR(S)  : Jong Gu It is certified that error appears in the above-identified patent and that said Letters Patent is hereby corrected as shown below:

This certificate supersedes Certificate of Correction issued April 9, 2002 since the patent number was erroneously mentioned, no Certificate of Correction was granted, and should be deleted.

Signed and Sealed this

Sixteenth Day of July, 2002

*Attest:*

*Attesting Officer*

JAMES E. ROGAN
*Director of the United States Patent and Trademark Office*